(12) United States Patent
Thilly et al.

(10) Patent No.: US 7,851,538 B2
(45) Date of Patent: Dec. 14, 2010

(54) LASER SEALING ELASTOMER

(75) Inventors: Jacques Thilly, Rixensart (BE); Christian Vandecasserie, Rixensart (BE)

(73) Assignee: Aseptic Technologies S.A. (BE)

( * ) Notice: Subject to any disclaimer, the term of this patent is extended or adjusted under 35 U.S.C. 154(b) by 1137 days.

(21) Appl. No.: 10/566,615

(22) PCT Filed: Aug. 2, 2004

(86) PCT No.: PCT/EP2004/008703

§ 371 (c)(1),
(2), (4) Date: Aug. 29, 2006

(87) PCT Pub. No.: WO2005/014419

PCT Pub. Date: Feb. 17, 2005

(65) Prior Publication Data

US 2007/0065611 A1    Mar. 22, 2007

(30) Foreign Application Priority Data

Aug. 4, 2003  (GB) .................................. 0318242.5

(51) Int. Cl.
*C09B 67/00*      (2006.01)
*B32B 1/08*       (2006.01)

(52) U.S. Cl. ..................................... 524/502; 428/35.7
(58) Field of Classification Search .................. 524/502
See application file for complete search history.

(56) References Cited

U.S. PATENT DOCUMENTS

| 3,650,664 A * | 3/1972 | De Graff et al. ............ 427/391 |
| 2003/0088216 A1 * | 5/2003 | Py .............................. 604/203 |
| 2003/0175488 A1 * | 9/2003 | Asthana et al. ............. 428/212 |

FOREIGN PATENT DOCUMENTS

| WO | WO 02/064439 | 8/2002 |
| WO | WO 03/028785 | 4/2003 |
| WO | WO 2004/018317 | 3/2004 |

OTHER PUBLICATIONS

European Office action, Application No. 04 763 760.8, 5pp. (Oct. 17, 2006).
Indian Office action, Application No. 430/KOLNP/2006, 7pp. (Nov. 8, 2002).
Chinese Office action, Application No. 200480028573X, 7pp. (Mar. 13, 2009).
Russian Office action, Application No. 2006102983/12/(003247), 5pp. (Jul. 29, 2008).
New Zealand Office action, Application No. 545151, 2pp. (Sep. 14, 2007).
Philippines Office action, Application No. 12006500263, 1p. (Aug. 4, 2008).
Malaysian Office action, Application No. PI 20043121, 3pp. (Jun. 23, 2008).
Pakistan Office action, Application No. 590/2004, 1p. (date unknown).
P.R. China Office action, Application No. GCC/P/2004/3691, 6pp. (Feb. 3, 2009).
Australian Office action, Application No. 2004263313, 2pp. (Jun. 11, 2009).

* cited by examiner

*Primary Examiner*—Ling-Siu Choi
*Assistant Examiner*—Hui Chin
(74) *Attorney, Agent, or Firm*—Klarquist Sparkman, LLP

(57) ABSTRACT

A novel elastomer material having an absorption coefficient for laser light of 0.5-2.5 $mm^{-1}$, preferably being a base thermoplastic elastomer compounded with a colorant which comprises a Pantone 4597C pigment mixed with a carrier material. The elastomer is suited for use as a pharmaceutical vial closure which can be punctured by a filling needle and the puncture hole heat sealed by a focused laser.

14 Claims, 2 Drawing Sheets

LASER SEALING ELASTOMER

This invention relates to a novel product comprising a novel elastomer material, to uses of this elastomer material, to products made using it, and processes for making and using it.

Elastomer materials are well known and have innumerable uses. A particular use is for the manufacture of closures for pharmaceutical vials and plungers for hypodermic syringes.

Drug substance and vaccine products are frequently provided in vials which are closed with an elastomer closure part through which a hollow needle can be passed, puncturing the closure part, and via which the drug substance or vaccine product may be extracted for use, optionally after reconstitution by an aqueous medium introduced into the vial via the needle. Normally such a vial has a mouth opening bounded by a flange-shaped rim, and the closure part is held in a closing relationship with the mouth opening by a flexible metal clamp part which surrounds the perimeter of the closure part and holds it tightly against the rim.

It is also known, e.g. from WO-A-02/064439 and WO-A-04/08317, to provide a pharmaceutical vial having a closure part made partly or wholly of thermoplastic elastomer material, and e.g. from WO-A-03/028785 to provide a hypodermic syringe having a plunger made partly of a thermoplastic elastomer material. Such a vial or syringe can be filled using a hollow needle passed through the closure part or plunger respectively, the needle is then withdrawn, and the small residual puncture hole in the closure or plunger may then be sealed by heat sealing, e.g. using a focused laser beam.

Known elastomer materials present problems when they are used as a material for the closure part or plunger disclosed respectively in WO-A-02/064439, WO-A-03/028785 or WO-A-04/08317. For example known polymers generate smoke as they are heated by the laser beam, which may contaminate the contents of the vial. Known polymers also have a low diffusion of the laser power so that a significant proportion of the laser power can pass through the closure or plunger to the contents of the vial or syringe, possibly damaging the contents.

It is an object of this invention to address these problems of the state of the art. Other objects and advantages of the invention will be apparent from the following description.

According to this invention an elastomer material is provided, having an absorption coefficient for laser light of 0.5-2.5 $mm^{-1}$.

As will be seen below the principal intended use of the elastomer material of the invention is for pharmaceutical vial closures and plungers for hypodermic syringes in which a residual puncture hole can be made and sealed by melting the elastomer material adjacent the residual puncture hole with a beam of laser radiation directed at the site of the puncture.

For this purpose suitably the elastomer material is based upon a base thermoplastic elastomer ("TPE") which has a melting point less than 200° C., preferably 180° C. or less. The base TPE may also be selected on the basis of properties known to be suitable for use as vial closures and plungers, e.g. elasticity, hardness, compatibility with pharmaceutical uses etc.

Preferably the elastomer material of the invention comprises a base thermoplastic elastomer compounded with a colourant to have the absorption coefficient for laser light of 0.5-2.5 $mm^{-1}$.

Preferably the base TPE is a styrene-ethylene/butylene-styrene ("SEBS") thermoplastic elastomer. Such elastomers are well known, e.g. with a resin modifier which interacts with the polystyrene end blocks, essentially increasing their size and their effective glass transition temperature, or styrene-ethylene/butylene-styrene-styrene-butylene-styrene ("SEBS-SBS") copolymers. Known TPE's of this type may be based on known Kraton™ SEBS elastomers. Such elastomers have low compression set at room temperature, i.e. when stretched they show little tendency to neck, making them suitable for sealing against rigid surfaces, such as the mouths and necks of pharmaceutical vials. A preferred type of SEBS elastomer is that available under the name Evoprene™ for example from Laporte Alphagary, particularly the SEBS with resin modifier materials available under the name Evoprene™ Super G, in particular Evoprene™ Super G 948, Evoprene™ TS2525 also being suitable but having a less favourable water permeability than Super G 948. Other suitable SEBS elastomers include the SEBS-styrene butadiene styrene material available under the name Cawiton™, e.g. the SEBS-SBS material Cawiton™ PR5947 available from Wittenburg (NL) and C-Flex R70-001 available from CPT (USA). SEBS elastomer materials with similar properties to these would also be suitable.

Other types of base TPE may be used, for example styrene/butadiene/styrene ("SBS") tri-block copolymers, and styrene-(butadiene/butylene)-styrene ("SBBS") tri-block copolymers.

The colourant imparts a colour to the elastomer material of the invention. The property of having a colour inherently means that light of certain wavelength is absorbed rather than transmitted by the coloured material, and it is principally the colour of the elastomer that is responsible for the absorption coefficient. The colour imparted is not critical provided that the defined absorption coefficient is achieved. It is believed that depth of colour rather than the colour itself may be the important factor in determining the absorption coefficient, but a grey colour is suitable.

The colourant preferably comprises a pigment or a mixture of pigments mixed with a carrier material. The carrier material is suitably a polymer which can be compounded with the elastomer. Such colourants are commonly used in the field of manufacture of polymer, including elastomer, products and the mixture of pigment and carrier material is known in the art as a "masterbatch". It is a standard process in this field to prepare a colour masterbatch of a defined colour and/or composition which can easily be reproduced, and to compound this masterbatch in a defined ratio with a bulk of elastomer to produce an elastomer of a reproducible colour.

A suitable pigment has the grey-green colour Pantone 5497C or a similar grey or grey-green colour. The Pantone Matching System (PMS) is a system shared world wide by the graphic arts industry. Similar colours include Pantone 556C, 5565C, 563C, 570C, 5555C. Suitably a mixture of pigments may comprise a mixture of the pigments: white 6 (typically titanium dioxide), black 7 (typically carbon black), green 7 (typically copper phthalocyanine CAS No. 1328-53-6) and blue 29 (typically ultramarine blue). These pigments are also standard nomenclature in the art, e.g. as referenced under their INCI name. It will be apparent to those skilled in the art how to prepare a pigment of colour Pantone 5497C or a similar grey colour using such pigments.

Various suitable carrier materials for TPE's are known in the art. For example ethylene vinyl acetate (EVA), low density polyethylene (LDPE) and polypropylene (PP). Appropriate carrier materials of this type for a particular base TPE and for use in pharmaceutical applications are well known in the polymers art and are available from numerous suppliers e.g. PolyColour Plastics Ltd., Telford, Shropshire GB.

The amount of pigment used in the colourant to make the masterbatch, and the amount of the colourant masterbatch mixed with the elastomer will vary from application to application, for example depending upon the natural colour of the SEBS thermoplastic elastomer, but can be determined empirically to achieved the desired absorption coefficient. For example the colourant mixture may comprise 10-50, typically 40+/−5, wt. % pigment, the balance up to 100% comprising the carrier material.

Typically the elastomer material of the invention may comprise 1-15 wt. %, typically 3-14 wt %, preferably 1-10 wt. % of colourant (masterbatch), the balance up to 100% comprising the base TPE. Compounding of the masterbatch with the base TPE is a well known conventional procedure.

A preferred elastomer material of the invention comprises a SEBS elastomer such as preferably Evoprene™ Super G, compounded with 1-5 wt %, especially 1.2-2 wt % of a colourant masterbatch comprising an EVA carrier with 35-45 wt % of pigment of a colour Pantone 5497 or similar colour, e.g. based on the mixture of pigments listed above.

Another suitable elastomer material of the invention comprises Evoprene™ TS2525, compounded with 1-5 wt %, especially 1.2-2 wt % of a colourant masterbatch comprising an EVA carrier with 35-45 wt % of pigment of a colour Pantone 5497 or similar colour, e.g. based on the mixture of pigments listed above.

Another suitable elastomer material of the invention comprises a SEBS-SBS elastomer preferably Cawiton™ PR5947, compounded with 3-15 wt % of a colourant masterbatch comprising an LDPE carrier with 15-20 wt % of pigment of a colour Pantone 5497 or similar colour, e.g. based on the mixture of pigments listed above.

The absorption coefficient relates to the thickness in mm of the elastomer material in which 99% of laser radiation energy incident upon a surface of the elastomer material is absorbed. If the laser radiation is absorbed too close to the surface upon which the radiation impinges then the surface can become too hot when used in the principal intended use outlined above and smoke and other pyrolytic decomposition products may be emitted. If the laser radiation is not absorbed by the thickness of a pharmaceutical vial closure or plunger it may pass through and affect the contents of the vial or syringe. Typically the thickness of the part of a vial closure to be used in the above mentioned purpose is 0.5-2.5 mm, typically 1.5-2.5 mm, preferably ca. 2 mm and it is preferred that the absorption coefficient and thickness of the part is such that at an incident laser power of up to 8 W less than 6% of the laser power passes through into the vial. Although the laser radiation wavelength is not critical a wavelength of 980 nm is suitable, at a laser power of up to ca. 20 W, preferably up to ca. 4-10 W, e.g. ca. 8.0+/−0.5 W. The absorption coefficient is preferably in the range 1.0-2.5 mm$^{-1}$ preferably 1.5-2.2 mm$^{-1}$, ideally as close to 1.5 mm$^{-1}$ as can be achieved, e.g. 1.4-1.6 mm$^{-1}$.

The absorption coefficient $\alpha$ may be measured using methods apparent to those skilled in the art based on the Beer-Lambert law. One such method involves relating incident laser power arriving at the incident surface (Pi) to the laser power transmitted through the material (Pt) i.e. emerging from the opposite surface, in the relationship:

$$Pt = Pi \times \exp^{-\alpha L}$$

Where $\alpha$ is the absorption coefficient and L is the thickness of the material. For example a measuring system may comprise a suitable laser of power low enough that the properties of the material are not affected e.g. by thermal decomposition e.g. generating 200-400 mW, directing the laser light along a suitable light guide, e.g. an optic fibre, toward a power measuring instrument. The laser power detected in the absence of any material between the light guide and the instrument may be defined as Pi. Material of measured thickness L may then be positioned between the light guide and the instrument and the laser power detected by the instrument may then be measured as Pt. For accuracy the measurement may be done repeatedly with one layer of the material, giving a Pt$^1$, then with a stack of two layers of the material, giving a measurement Pt$^2$, then with a stack of three layers of the material, giving a measurement Pt$^3$. Two values of $\alpha$ may then be calculated by the relationships:

$$\alpha_1 = \frac{-1}{L} \times \ln \frac{(Pt^2)}{(Pt^1)}$$

$$\alpha_2 = \frac{-1}{L} \times \ln \frac{(Pt^3)}{(Pt^2)}$$

The value of $\alpha$ for the material may then be calculated as the mean of all the measured values of $\alpha$, e.g. of $\alpha_1$ and $\alpha_2$.

The process of compounding of the elastomer of this invention is standard in the art of elastomer manufacture, and numerous competent organisations are known which are capable of manufacturing such an elastomer and the appropriate colourant masterbatches.

The elastomer material of this invention may also incorporate other materials common in the field of manufacture of closures for pharmaceutical vials. For example the material may contain a filler, typically ca. 20%. Suitable fillers should be selected from materials which are compatible for use in such applications, e.g. being of pharmaceutical grade. For example although calcium carbonate may be used as a filler this can affect the pH of liquids contained in the vial. A preferred filler is Kaolin (China Clay) of a pharmaceutical grade. An example of such Kaolin is that available under the brand Polestar 200P, from Imeryis Minerals Ltd., (GB).

In a further aspect the present invention provides a closure for a pharmaceutical vial made wholly or partly of an elastomer material as described above.

In a further aspect the present invention provides a plunger for a hypodermic syringe made wholly or partly of an elastomer material as described above.

The hardness, elasticity etc. of the base TPE selected for use in the manufacture of such a vial closure or syringe plunger may be typical of TPE's presently used for closures and plungers. The base TPE and all other components of the elastomer when used for a vial closure or syringe plunger must be compatible with medical use.

Such a closure or plunger is preferably adapted so that a vial or syringe provided with such a closure or plunger may be used in a process in which the point of a hollow needle is passed through the closure part or plunger so that the point is within the vial, a fluid contents material such as a drug or vaccine solution or suspension, or a reconstitution fluid is introduced into the vial or syringe through the needle, the needle is then withdrawn, and the small residual puncture hole left by the needle in the closure or plunger is sealed by heat sealing of the outside of the closure or plunger, e.g. using a focused laser beam.

WO-A-04/08317 and WO-A-02/064439 respectively disclose a vial closure of monolithic construction and of two-part, i.e. having a base portion, and a re-sealable portion made of a fusible material, construction. WO-A-03/0287785 discloses a syringe plunger having a penetrable region which is fusible. The closure and plunger of the latter two aspects of this invention may be constructed in the manner described respectively in WO-A-04/08317, WO-A-02/064439 and WO-A-03/0287785, and the elastomer material of this invention may be used as the fusible material thereof.

Advantageously, the closure and plunger of the latter two aspects of this invention may be of single-part construction, i.e. made entirely of the elastomer material of this invention, as for example disclosed in WO-A-04/08317.

A closure of this aspect of the invention may be of generally conventional construction, but for example a suitable construction of a closure part for a vial which may be made from the elastomer material of the invention is described as the "closure part" in applicant's WO-A-04/08317.

Such a closure may comprise an upper part comprising a closure wall and descending therefrom a lower plug part which can fit into the mouth opening of a vial, and preferably at least the upper surface of the closure wall, preferably the entire closure wall, preferably the whole of the closure part is made of the thermoplastic elastomer material of the invention, so that a puncture hole through the closure wall formed as a result of filling the vial using a hollow needle as described above may be sealed by thermal sealing, e.g. using a focused light beam such as a laser. The closure wall normally extends across the mouth opening of the vial. Typically the closure wall of such a closure has a thickness ca. 2 mm. Such a closure may also comprise a flange part to form a seal between the closure and the rim of the mouth opening of the vial. Typically the closure wall of such a closure has a thickness ca. 2 mm.

Therefore the invention further provides a closure for a pharmaceutical vial having a closure wall comprised of an elastomer material such that when laser light is directed on the outer surface of the closure wall 99% of the laser power is absorbed within 0.5-2.5 mm depth from the outer surface, preferably within 1.0-2.5 mm$^{-1}$ preferably 1.5-2.2 mm$^{-1}$, ideally as close to 1.5 mm$^{-1}$ as can be achieved, e.g. 1.4-1.6 mm$^{-1}$, with the effect of melting the material. The elastomer material of the present invention provides the advantage that under irradiation from a focused 980 nm laser of power less than 20 W, typically 4-10 W, e.g. ca. 8 W the thermoplastic elastomer material easily fuses e.g. after ca. 0.5-2 seconds, e.g. 1 second maximum irradiation, and sets on cooling without emission of significant quantities of contaminating smoke. The defined absorption coefficient has the advantage that when the closure wall of such a closure is of a conventional thickness e.g. ca. 2.0 mm a negligible amount of laser power, typically less than 6% may penetrate through the closure to reach the interior.

Therefore in a further aspect the present invention provides a closure for a pharmaceutical vial, or a plunger for a hypodermic syringe, made wholly or partly of a thermoplastic elastomer compounded with a colourant to the extent that less than 6%, preferably less than 4%, preferably less than 2%, of laser light of wavelength 980 nm and incident power up to 8 W penetrates through the closure to reach the interior of the vial or plunger.

Preferred elastomer materials, colourants and compositions for such an elastomer material are as discussed above.

The closure and plunger of this invention may be made by methods involving conventional injection moulding processes.

In a further aspect of this invention a process is provided for introducing a substance into a vial comprising: providing a vial having a mouth opening closed by a closure of this invention, passing a hollow needle through the closure, introducing the substance into the vial via the needle, withdrawing the needle from the vial and closure, and sealing the small residual puncture hole in the closure by heat sealing, i.e. by heating the elastomer material of the closure adjacent the puncture site so that the material fuses, e.g. using a focused laser beam, then allowing the material to cool and set.

Suitable hollow needles are known in the art, but preferred hollow needles are disclosed in PCT/EP04/004501.

In a preferred form of this process the heating of the elastomer material of the closure adjacent the puncture site so that the material fuses is done by directing laser light, preferably focused, onto the elastomer material adjacent the puncture site. Suitably the laser beam may have a power less than 20 W, typically 4-10 W, e.g. typically nominally 8 W. Suitably the laser beam may have a wavelength of nominally 980 nm. Lasers of this type are commercially available e.g. red—infrared diode lasers, typically having an output in the range 960-1000 nm. Typically in the process of the invention such a laser beam may be directed at the elastomer material adjacent to the puncture site for a suitable length of time to achieve melting of the elastomer material such that through at least part of the thickness of the closure the melted elastomer material fuses to close the puncture hole. Suitably the laser beam may be focused to form a spot of dimension 0.1-2, preferably 0.1-1.0, mm across the beam direction on the surface of the closure. Preferably the area of the spot is greater than the area of the puncture hole, e.g. at least 1.5 times greater, preferably at least 2 times greater, more preferably 3 or more times greater. Under such conditions the elastomer material may be raised to a suitable temperature in excess of its melting point during ca. 0.5-2 seconds exposure to such a laser beam. During such a process the temperature of the elastomer material adjacent the puncture site may be measured using a suitable temperature sensor, or the equipment used to perform the process may be pre-calibrated to achieve the suitable temperature.

Suitably the process may be performed with the vial with its closure being conveyed on a conveyor system into a position adjacent to a suitable source of laser light, for example an optical guide to direct and focus laser light onto the closure. A suitable form of conveyor is for example disclosed in WO-A-04/026735. Whilst the vial with its closure are in the position adjacent to a suitable source of laser light the source of laser light and the vial may be relatively arranged, for example the conveyor system and the source of laser light may be relatively arranged, so that there is no relative movement of the closure and the spot on the closure at which the laser light is focused. For example the conveyor may convey the vial in a conveying direction, and whilst the laser light is directed at the closure the motion of the conveyor may be temporarily halted, or alternatively the source of laser light may be moveable by known means so that there is no relative motion in the conveying direction between the closure and the spot on the closure at which the laser light is focused. Conveniently an obstructer means, e.g. an optical shutter may be provided between the source of laser light and such a conveyor to obstruct laser light from reaching the closure except when required for the purpose of sealing the puncture site.

Preferably in this process, before the step of passing a hollow needle through the closure the area of the closure through which the needle is to pass, preferably the entire outer surface of the closure, more preferably also the entire outer surface of the vial, is sterilised by exposure to radiation. A preferred radiation is electron beam ("e-beam") radiation. A suitable process for sterilising the outer surface of the closure and vial is for example disclosed in PCT/EP04/001752, in which vials conveyed into a shielded enclosure, exposed to electron beam radiation in this enclosure, then conveyed out of the enclosure before the step of passing a hollow needle through the closure.

Preferably in this process, before the substance is introduced into the vial via the needle, the interior of the vial is sterile. In a preferred form of the process vials with their mouths closed by the closures are provided with their interiors sterile by the process disclosed in the PCT application claiming priority from GB 0315953.0 filed 8 Jul. 2003, in which vials and closures are made by moulding under conditions such that the moulded vials and closures are sterile, then the vials and closures are assembled in a sterile (aseptic) environment. The elastomer materials of this invention are suitable for this process.

In a further aspect a process is provided for introducing a substance into a hypodermic syringe comprising: providing a syringe having a plunger of this invention, passing a hollow needle through the plunger, introducing the substance into the vial via the needle, withdrawing the needle from the syringe and plunger, and sealing the small residual puncture hole in the plunger by heat sealing, e.g. using a focused laser beam as described above.

The invention will now be described by way of non-limiting example only.

EXAMPLE 1

Elastomer Material Compositions

Figure 1:
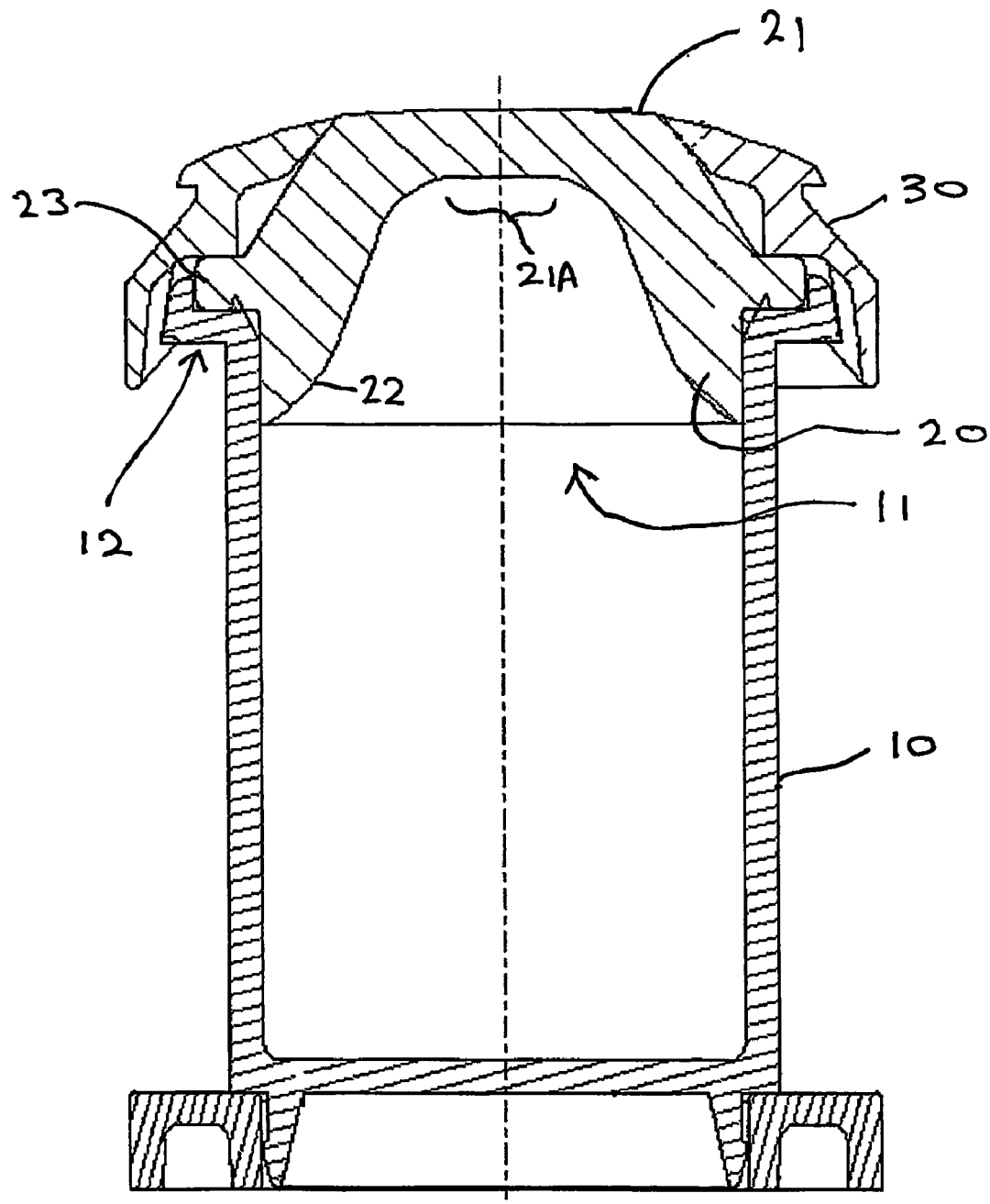
FIG. 1 shows a longitudinal section through a pharmaceutical vial and a closure made of elastomer material of this invention.

| (Example No) Base TPE | Masterbatch Wt % | Carrier | Pigment wt % | Pigment Colour |
|---|---|---|---|---|
| (1) Evoprene Super G948 | 1.48 | EVA | 40 | Pantone 5497C |
| (2) Evoprene TS2525 | 1.48 | EVA | 40 | Pantone 5497C |
| (3) Cawiton PR5947 A | 8.2 | LDPE | 18 | Pantone 5497C |
| (4) C-Flex R70-001 | 8 | Polypropylene | | Pantone 5497C |

In these Examples the base elastomer, in a grade suitable for use in a pharmaceutical vial closure, was supplied from the suppliers indicated below. In each Example the colourant Masterbatch is composed of the carrier compounded with the pigment at the indicated pigment loading. In each Example the pigment is made up of the pigments white 6, black 7, green 7 and blue 29 in suitable proportions to achieve the Pantone 5497 colour. In each Example the Masterbatch was made up by a commercial colourant compounder using known grades of the carrier material suitable for use in a pharmaceutical vial closure and given the Compounder's reference as below.

| Ex. No. | Base elastomer supplier | Compounder | Masterbatch Ref. |
|---|---|---|---|
| (1) | Alphagary (GB) | Polycolour Plastics (GB) | 31622-M2 |
| (2) | Alphagary (GB) | Polycolour Plastics (GB) | 31622-M2 |
| (3) | Wittenburg (NL) | Qolortech B.V (NL) | Masterminds PE Green 60-11.3570 |
| (4) | CPT (USA) | Clariant (USA) | PA5497 Misty green |

The compounding procedure for making up the colourant Masterbatch and then compounding the base elastomer with the Masterbatch was entirely conventional in the elastomer art. A requirement was set that 99% of laser power of 8 W at 980 nm was to be absorbed after passage through a maximum of 2 mm of the elastomer i.e. an absorption coefficient α as defined above of 2 mm$^{-1}$, optimally 1.5 mm$^{-1}$. The base elastomer was taken and its absorption coefficient α was measured. Various blends of base elastomer and the colourant masterbatch were then compounded with various proportions % of the masterbatch and the absorption coefficient α for each blend was measured so a graph of α against % masterbatch could be made. From this graph and based on the Beer-Lambert law a compound of base elastomer and masterbatch could be made having the desired absorption coefficient α.

Each of the elastomer materials of Examples 1-4 had an absorption coefficient α as defined above of ca. 1.5 mm$^{-1}$ for laser light of wavelength 980 nm, measured using the method described above, i.e. 99% of such laser light at a power 8 W was absorbed in this thickness of the elastomer material. This resulted in melting of the elastomer material adjacent a puncture hole in ca. 1 second.

The elastomer materials of Examples 1-4 could easily be made by injection moulding into vial closures of conventional shape or as disclosed in WO-A-04/08317 using a conventional injection moulding procedure.

Such a vial closure is shown in FIG. 1, in which vial 10 shown in longitudinal sectioned view has an upper mouth opening 11 closed by a closure 20. Closure 20 comprises an upper closure wall 21 from which descends a plug part 22 which fits in a tight sealing fit in the mouth opening 11 of vial 10. The closure also has a peripheral flange 23 which mates with a flange 12 of the vial 10. The closure 20 is held in place on vial 10 as shown by clamp part 30 which snap-fits over the flange 12. The central part 21A of closure wall 21 has a thickness ca. 2 mm.

When made of any of the materials of Examples 1-4 above it was found that such closures 20 could easily be punctured by a needle (not shown) passed in a downward direction as shown through the central part 21A of closure wall 21, and when the needle was subsequently withdrawn the residual puncture hole could be sealed in a few seconds by melting the surrounding elastomer material with a focused laser beam of wavelength 980 nm and power 8 W, then allowing the melted material to cool and set. Negligible smoke or other volatile potential contaminants were emitted from the elastomer material during this process. Also it was found that with a closure wall (i.e. the part 24 identified in FIG. 1 of WO-A-04/08317) thickness of 1-2 mm less than 6% of the laser power was transmitted through the closure wall to reach the interior of the vial.

Figure 2:
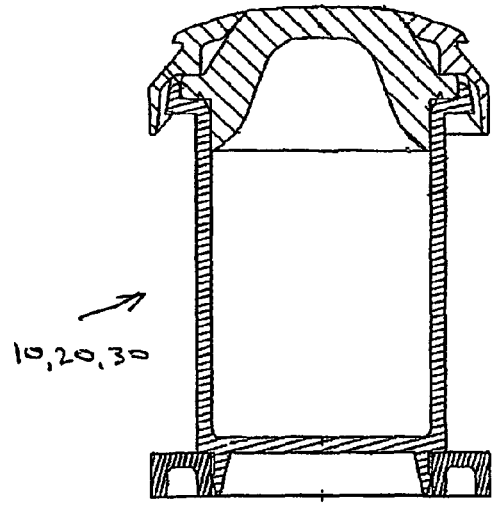
FIGS. 2-5 show the use of the vial of FIG. 1 in a filling process.
Figure 3:
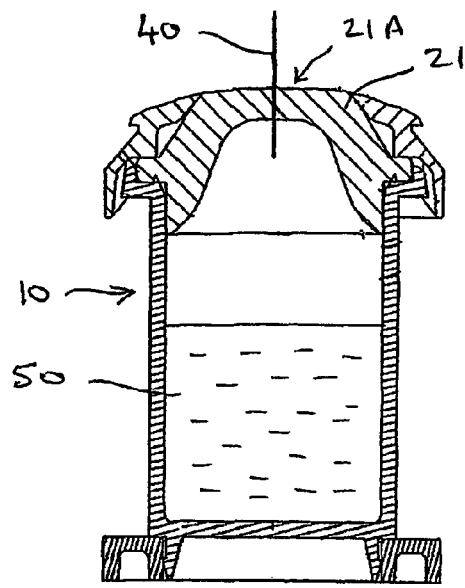
Figure 4:
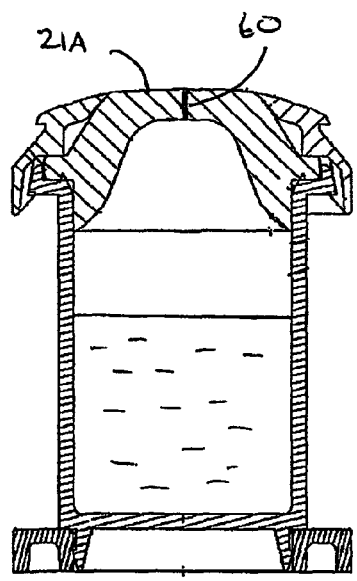
Figure 5:
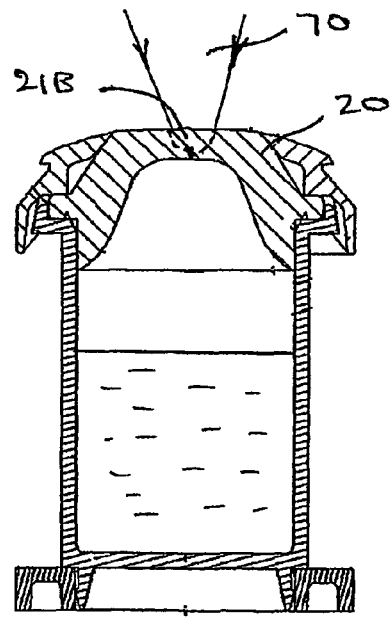

This process is shown schematically in FIGS. 2-5. FIG. 2 shows a vial 10 plus closure 20 and clamp 30 as in FIG. 1. FIG. 3 shows how a hollow filling needle 40 has been passed through part 21A of closure wall 21 and liquid content 50 introduced into vial 10 via needle 40, air venting out of the vial 10 between the needle 40 and closure 20, assisted by venting grooves (not shown) in the outer surface of needle 40. FIG. 4 shows that the needle 40 has been withdrawn, leaving a residual puncture hole 60 through the part 21A of the closure wall 21. FIG. 5 shows that laser light 70 is focused onto the upper surface of part 21A and is absorbed as heat to result in melting of the zone 21B of wall 21 i.e. to a depth of ca. 1.5 mm, thereby on subsequent cooling and solidifying of the melted material of closure 20 sealing puncture hole 60.

The invention claimed is:

1. A closure for a vial or a plunger for a hypodermic syringe comprising an elastomer material comprising a base thermoplastic elastomer of styrene-ethylene/butylene-styrene thermoplastic elastomer compounded with a colourant to have an absorption coefficient for laser light at a wavelength of 960-1000 nm of 0.5-2.5 $mm^{-1}$.

2. The closure for a vial or a plunger for a hypodermic syringe of claim 1 wherein the base thermoplastic elastomer has a melting point of 200° C. or less.

3. The closure for a vial or a plunger for a hypodermic syringe of claim 1 wherein the colourant comprises a pigment or mixture of pigments mixed with a carrier material.

4. The closure for a vial or a plunger for a hypodermic syringe of claim 3 wherein the pigment or mixture thereof has the colour Pantone 5497C, 556C, 5565C, 563C, 570C, 5555C or a similar grey or grey-green colour.

5. The closure for a vial or a plunger for a hypodermic syringe of claim 4 wherein the colourant comprises a mixture of the pigments: white 6, black 7, green 7 and blue 29.

6. The closure for a vial or a plunger for a hypodermic syringe of claim 3 wherein the carrier material comprises ethylene vinyl acetate, low density polyethylene or polypropylene.

7. The closure for a vial or a plunger for a hypodermic syringe of claim 3 wherein the colourant comprises 10-50 wt. % pigment, the balance up to 100% comprising the carrier material.

8. The closure for a vial or a plunger for a hypodermic syringe of claim 3 wherein the elastomer material comprises 1-15 wt. % of colourant, the balance up to 100% comprising the base thermoplastic elastomer.

9. The closure for a vial or a plunger for a hypodermic syringe of claim 1 wherein the base styrene-ethylene/butylene-styrene thermoplastic elastomer is compounded with 1-5 wt. % of a colourant master batch comprising an ethylene vinyl acetate carrier with 35-45 wt. % of pigment of a colour Panton 5497C, 556C, 5565C, 563C, 570C, 5555C or a similar grey or grey-green colour.

10. The closure for a vial or a plunger for a hypodermic syringe of claim 1 wherein the base thermoplastic elastomer is compounded with 3-15 wt. % of a colourant master batch comprising an LDPE carrier with 15-20 wt. % of pigment of a colour Panton 5497C, 556C, 5565C, 563C, 570C, 5555C or a similar grey or grey-green colour.

11. The closure for a vial or a plunger for a hypodermic syringe of claim 1 wherein the elastomer material has thickness of ca 2 mm that allows less than 6% of laser power up to 8 W incident power to pass through.

12. The closure for a vial or a plunger for a hypodermic syringe of claim 1 wherein the elastomer material has an absorption coefficient of 1.0-2.5 $mm^{-1}$.

13. The closure for a vial or a plunger for a hypodermic syringe of claim 1 wherein the elastomer material having has an absorption coefficient of 1.5-2.2 $mm^{-1}$.

14. The closure for a vial or a plunger for a hypodermic syringe of claim 1 wherein the elastomer material has an absorption coefficient of 1.4-1.6 $mm^{-1}$.

* * * * *